Feb. 16, 1932.  I. M. LADDON ET AL  1,845,802
AEROPLANE WHEEL
Filed Aug. 15, 1927
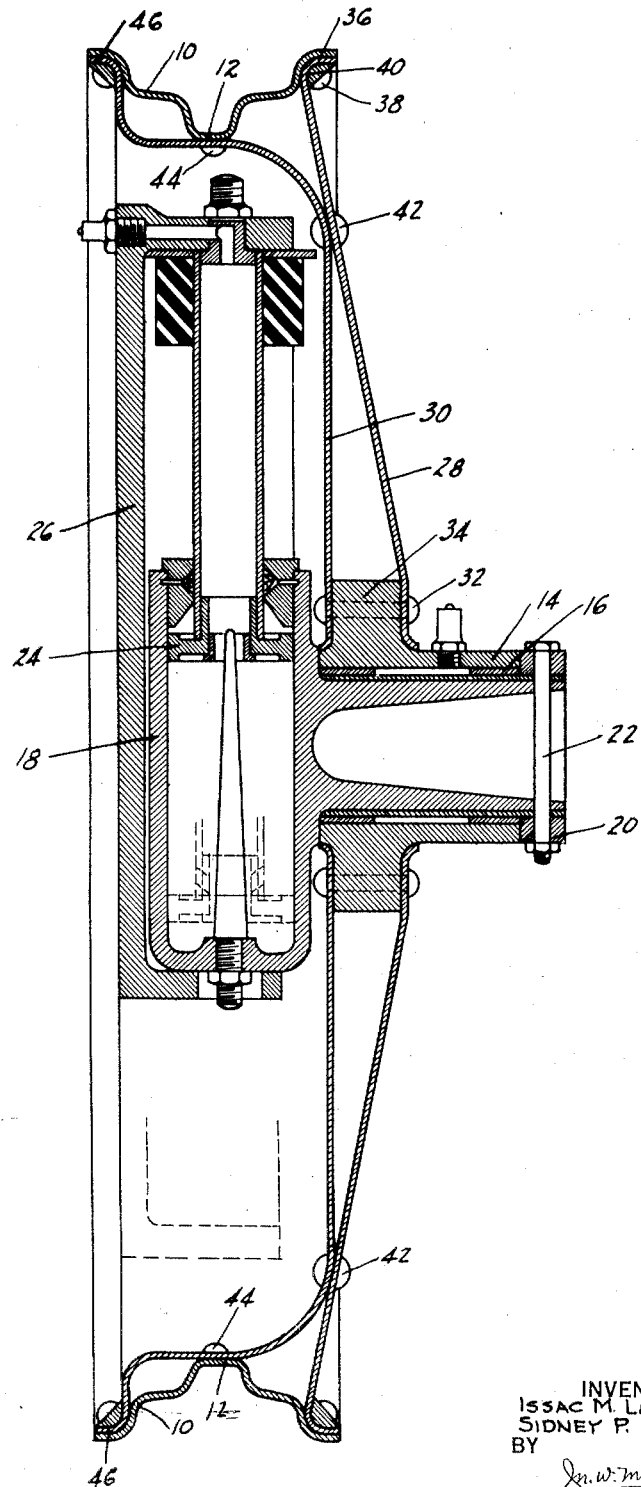
INVENTOR
ISSAC M. LADDON
SIDNEY P. LYON
BY
ATTORNEY Patented Feb. 16, 1932

1,845,802

UNITED STATES PATENT OFFICE

ISAAC M. LADDON, OF DAYTON, AND SIDNEY P. LYON, OF TIPPECANOE CITY, OHIO, ASSIGNORS, BY DIRECT AND MESNE ASSIGNMENTS, TO BENDIX BRAKE COMPANY, OF SOUTH BEND, INDIANA, A CORPORATION OF ILLINOIS.

AEROPLANE WHEEL

Application filed August 15, 1927. Serial No. 212,976.

This invention relates to wheels, and is illustrated as embodied in one of the wheels of an aeroplane. An object of the invention is to provide a very strong wheel which is dished in such a manner as to permit the arrangement, in the load plane of the wheel, of a device for absorbing the shock of landing.

In one desirable arrangement, the wheel includes two disks having a central hub projecting away from the load plane at the center of the wheel. Preferably the wheel has a rim, for example of the drop-center type, to which the disks are secured at their outer edges. One of the disks, shown as the inner one, is secured to the other disk in a plane spaced outwardly from the load plane, is then dished inwardly, preferably in such a manner as to engage the bottom of the drop center of the rim, and finally is secured to the opposite side of the rim.

The above and other objects and features of the invention, including various novel combinations of parts and desirable particular constructions, will be apparent from the following description of one illustrative embodiment shown in the accompanying drawing, in which:

The figure is a vertical central section through the wheel and its support.

The particular wheel selected for illustration includes an outer tire rim 10, shown as having a drop center 12, and a central tubular hub 14 rotatably mounted on a bearing on a spindle 16 which, with the hub 14, projects outwardly away from the load plane of the wheel. Spindle 16 may, if desired, be integral with a cylinder 18 forming part of the means for absorbing the shock of landing.

Hub 14 is confined endwise between cylinder 18 and a ring 20 held by a cross pin or the like 22. The shock absorber also includes a piston 24 in the cylinder 18, the piston being carried by a part 26 secured to the aeroplane proper and corresponding generally to an axle. The shock absorber is more fully described and is claimed in our co-pending application No. 212,974, filed August 15, 1927.

The body of the wheel preferably comprises two disks 28 and 30 secured, by rivets or the like 32, to opposite sides of a flange 34 extending outwardly from hub 14. Disk 28 is formed at its outer edge with a flange 36 underlapping the outer side flange of rim 10 and secured thereto by means such as rivets 38 passing through blocks 40.

Disk 30 is secured to disk 28, just inside the rim, by means such as rivets 42, and is then dished inwardly, thus bringing the shock absorber 18—24 substantially in the load plane of the wheel. The disk 30 engages, and preferably is secured by rivets 44 or the like, to the bottom of the drop center 12 of the rim, and finally is formed with a flange 46 underlapping the side flange of rim 10 opposite the disk 28, and secured thereto by means such as rivets 48 passing through blocks 50.

When it is desired to provide a brake engaging the inside of the dished portion of disk 30, the rivets 44 are omitted.

We prefer to make most or all of the above-described parts of relatively light material such as duralumin.

While one illustrative embodiment has been described in detail, it is not our intention to limit the scope of the invention to that particular embodiment, or otherwise than by the terms of the appended claims.

We claim:

1. A wheel comprising, in combination, a rim having a drop center, a hub at one side of the plane of one side of the rim, and a pair of disks secured to said hub, one of the disks being secured at its edge to the outer side of the rim, and the second disk being secured to the first disk just inside the rim and thence dished toward the inner side of the wheel and engaging the bottom of the drop center of the rim and finally secured to the side of the rim opposite the first disk, substantially all of the space within the rim being left unobstructed by the hub and disks.

2. A wheel comprising, in combination, a rim having a drop center, and two disks secured to each other inside of the circle of the rim, the disks being secured to the opposite sides of the rim and one of the disks being dished across the load plane of the wheel and engaging the bottom of the drop center of the rim in the load plane of the wheel.

3. A wheel comprising a rim provided with a drop center portion, together with a wheel body part secured to one side of the rim, said body part being arranged to cross the load plane of the wheel and being secured to said drop center portion in the load plane of the wheel, said body part being spaced from the wall of said rim between said secured points so as to serve as a strut for the side of said rim.

In testimony whereof, we have hereunto signed our names.

ISAAC M. LADDON.
SIDNEY P. LYON.